US012051872B2

(12) United States Patent
Liu

(10) Patent No.: US 12,051,872 B2
(45) Date of Patent: Jul. 30, 2024

(54) SHUTTERED KEYSTONE JACK ASSEMBLY

(71) Applicant: HSING CHAU INDUSTRIAL CO., LTD., Taipei (TW)

(72) Inventor: Yao-Wen Liu, Taipei (TW)

(73) Assignee: HSING CHAU INDUSTRIAL CO., LTD., Taipei (TW)

( * ) Notice: Subject to any disclaimer, the term of this patent is extended or adjusted under 35 U.S.C. 154(b) by 474 days.

(21) Appl. No.: 17/553,849

(22) Filed: Dec. 17, 2021

(65) Prior Publication Data

US 2023/0198190 A1 Jun. 22, 2023

(51) Int. Cl.

| | |
|---|---|
| ***H01R 13/00*** | (2006.01) |
| ***H01R 13/453*** | (2006.01) |
| ***H01R 13/518*** | (2006.01) |
| ***H01R 24/64*** | (2011.01) |

(52) U.S. Cl.
CPC ....... *H01R 13/4532* (2013.01); *H01R 13/518* (2013.01); *H01R 24/64* (2013.01)

(58) Field of Classification Search
CPC ... H01R 13/4532; H01R 13/518; H01R 24/64
See application file for complete search history.

(56) References Cited

U.S. PATENT DOCUMENTS

| | | | | |
|---|---|---|---|---|
| 5,580,280 | A * | 12/1996 | Minich | H01R 13/6595 333/182 |
| 6,869,297 | B2 * | 3/2005 | Caveney | H01R 13/4536 439/138 |
| 7,744,388 | B2 * | 6/2010 | Lee | H01R 13/4538 439/144 |
| 8,491,200 | B2 * | 7/2013 | He | G02B 6/4292 385/94 |
| 9,496,644 | B2 | 11/2016 | Bragg | |
| 2023/0198190 | A1 * | 6/2023 | Liu | H01R 24/64 439/139 |

* cited by examiner

*Primary Examiner* — Phuong Chi Thi Nguyen

(57) ABSTRACT

A shuttered keystone jack assembly is provided in the disclosure. The shutter keystone jack assembly includes a jack housing, a frame, a shutter and an elastic member. The frame is detachably disposed on the jack housing and defining a receiving opening. The shutter is pivotally connected to the frame and selectively covering the receiving opening. The elastic member includes a first end portion and a second end portion, and the first end portion and the second end portion respectively abut against the frame and the shutter.

18 Claims, 15 Drawing Sheets

SHUTTERED KEYSTONE JACK ASSEMBLY

BACKGROUND OF THE INVENTION

1. Field of the Invention

The present disclosure relates to a shuttered keystone jack assembly, and in particular to a shuttered keystone jack assembly capable of avoiding contaminants of entering the socket and preventing components from being worn out.

2. Description of the Related Art

Wired and wireless communication are ordinary to people in daily lives. As communicating techniques evolve to the $5^{th}$ generation, i.e., 5G, demands for Wi-Fi 6 projects that support faster communicating speed are more common than before, and more cabling connections are required to span from equipment to terminal devices. Refer to FIG. 1, a terminal device with a panel 10 including plural socket groups 12 is shown. Each socket group 12 has several sockets 12*a* whose housings are made of chromatic plastics, so technicians or users are able to easily distinguish every socket group 12 configured to be connected to different plugs from each other through their colors.

However, when plugs are connected to the sockets 12*a*, resulted electromagnetic interferences (EMI) tend to affect adjacent pairs of plug and socket, and transmission quality of electric signal may deteriorate. To solve this problem, as shown in FIG. 2, the housings of each socket 12*a*' are chosen from conductive materials like metals or alloys that are capable of providing an electromagnetic shielding effect, and the transmission quality is increased. Nevertheless, for concerns of costs of industrial components, these metals or alloys are hardly dyed with different colors, and users need to take more time to recognize each socket 12*a*' and their corresponding plugs. Besides, when the sockets 12*a* are not in use, contaminants such as dust and dirt would enter the socket 12*a*', and these contaminants may damage the plugs or the sockets 12*a*'.

A solution to overcome being polluted by the contaminants is to dispose shutters on receiving openings of sockets 12*a*'. According to US granted patent with publication number U.S. Pat. No. 9,496,644B2, Bragg provides a communication outlet for use with a communication plug. The outlet includes a shutter door biased by at least one biasing member toward a closed position in which the shutter door substantially obstructs the opening. The biasing member slides rearward and forward along the inside of the housing as the shutter door opens and closes, and the shutter door can thus prevent contaminants and/or objects other than the plug from being received inside the outlet.

However, when applying Bragg's communication outlet to a panel with sockets that have EMI immunity abilities, new issues are present. Since housings of sockets are made of metals or alloys to provide an electromagnetic shielding effect, relative sliding between housing and biasing members such as metal coil springs may wear out the components and thus reduces service lives of the outlets. Moreover, because pivoting and sliding simultaneously during operating of the shutter door, the biasing member is easily lost inside the housing when detached from the shutter door accidentally. Besides, a tightening loading from the biasing member and a pivoting loading from the face plate exert on different positions of the shutter door, which burdens the shutter door more severely.

BRIEF SUMMARY OF THE INVENTION

An objective of the present disclosure is to provide a shuttered keystone jack assembly that is capable of avoiding contaminants of entering the socket and preventing components from being worn out.

To achieve at least the above objective, the present disclosure provides a shuttered keystone jack assembly including a jack housing, a frame, a shutter and an elastic member. The frame is disposed on the jack housing and defines a receiving opening. The shutter is pivotally connected to the frame and selectively covers the receiving opening. The elastic member includes a first end portion and a second end portion, wherein the first end portion and the second end portion respectively abut against the frame and the shutter.

Preferably, the jack housing further has a second inner wall connected to the first inner wall and a second engaged portion disposed on the second inner wall. The frame further includes a second engaging portion substantially perpendicularly connected to a second side of the opening part and spaced apart from the first engaging portion, and the second engaging portion extends into the jack housing and is engaged with the second engaged portion.

Preferably, the opening part further includes a housing abutting portion disposed on the first side. As the frame is mounted to the jack housing, the housing abutting portion abuts against the jack housing, and the first engaging portion and the second engaging portion are pivoted about the housing abutting portion to respectively be engaged with the first engaged portion and the second engaged portion.

Preferably, the frame further includes an abutted portion disposed on the supporting part and forming a step difference with the supporting part, and the first end portion abuts against the abutted portion and is restricted by the step difference.

Preferably, the shutter includes a pin and a skirt portion. The pin is pivoted to the frame. The skirt portion is disposed apart from the pin. When the receiving opening is covered by the shutter, the skirt portion is pressed against and blocked by the opening part.

Preferably, the frame further includes a threshold portion disposed on the opening part and outside the jack housing. The shutter further includes an elastic portion disposed on the skirt portion, and the elastic portion is elastically deformed to cross over the threshold portion toward the jack housing as the shutter is mounted on the frame.

Preferably, the shutter further includes a holding portion disposed on the skirt portion. The shutter is pivoted between a closed position in which the receiving opening is covered by the shutter, and an open position in which the holding portion is engaged with the supporting part.

Preferably, the frame further includes a guiding portion connected between the opening part and the supporting part. The shutter includes a main body and a positioning portion disposed on a lateral side of the main body, and the positioning portion moves along the guiding portion as the shutter pivots with respect to the frame.

Preferably, the shutter is configured to pivot with respect to the frame about a pivot axis and includes a pin extending along the pivot axis, and the elastic member is sleeved on the pin.

Preferably, the frame has a pivoting hole and a pivoting protrusion extending along the pivot axis. The shutter further includes a main body connected with the pin. A recess is formed on an opposite side of the main body relative to the pin, and the pivoting protrusion and the pin are respectively accommodated in the recess and the pivoting hole.

Preferably, the frame further includes a guiding portion on which the pivoting hole is formed. An inlet is formed on a side of the guiding portion away from the jack housing and communicated with the pivoting hole.

Preferably, a cross-section of the pin is bounded by a superior arc and a chord terminating the superior arc. The inlet is sized to a height of the cross-section, and the height is less than a diameter of the pin.

Preferably, the shutter further includes a main body connected with the pin. A positioning groove is concaved relative to the main body and adjacent to the pin, and the second end portion is disposed in the positioning groove.

Preferably, the shutter further includes a blocking portion extending from the main body and adjacent to the pin. The elastic member further includes a connecting portion connected between the first end portion and the second end portion, and the connecting portion is blocked by the blocking portion so as to pre-press the elastic member as the shutter covers the receiving opening.

Preferably, the keystone jack assembly is adapted to receive a plug, and the shutter includes a front engaging portion facing opposite to the jack housing and selectively engaged with the plug.

Preferably, the frame and the shutter are made of chromatic plastics.

Preferably, the jack housing is manufactured by die-casting and made of a magnesium-zinc alloy.

DETAILED DESCRIPTION OF THE INVENTION

To facilitate understanding of the object, characteristics and effects of this present disclosure, embodiments together with the attached drawings for the detailed description of the present disclosure are provided.

Figure 1:
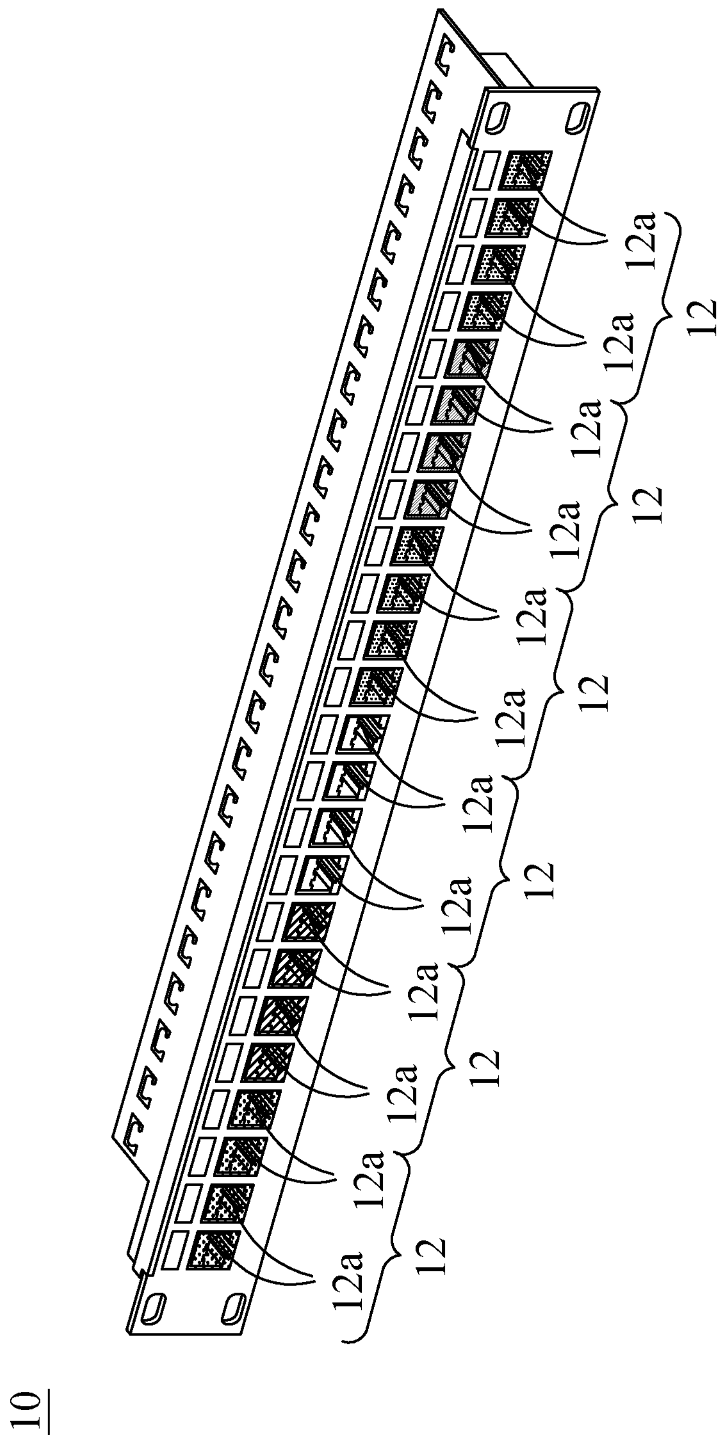
FIG. 1( prior art )
FIG. 1 is an illustrative diagram showing a conventional panel with a plurality of sockets respectively belong to different socket groups.
Figure 2:
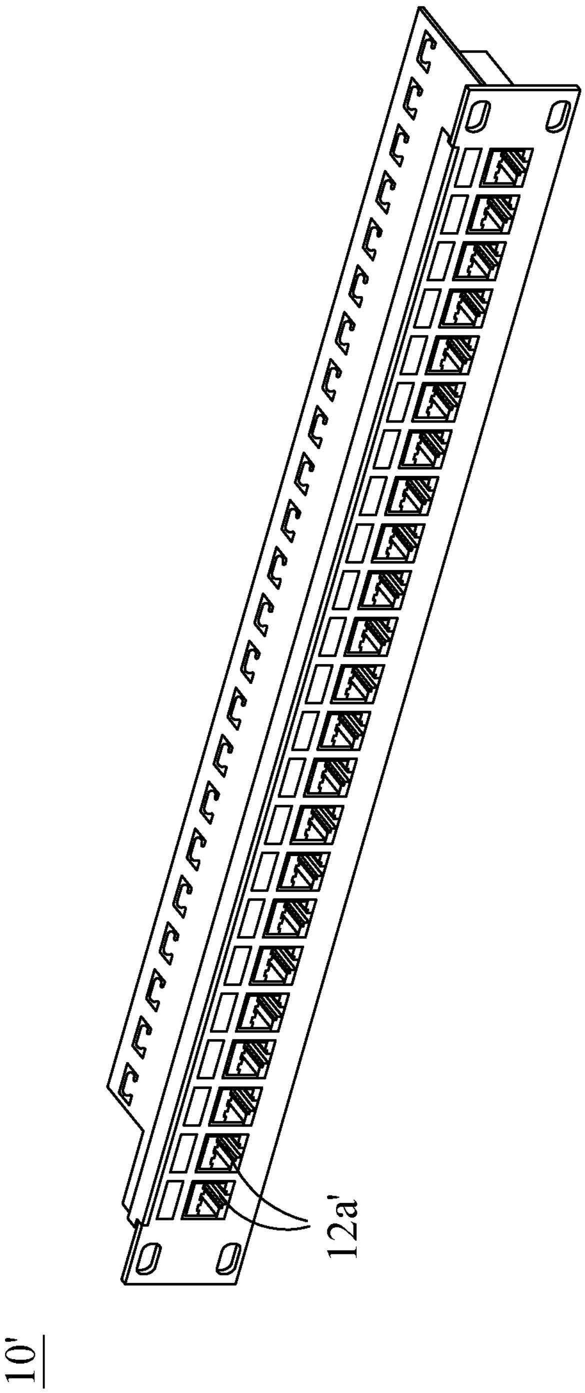
FIG. 2( prior art )
FIG. 2 is an illustrative diagram showing another conventional panel with a plurality of sockets whose housings are chosen from conductive materials.
Figure 4:
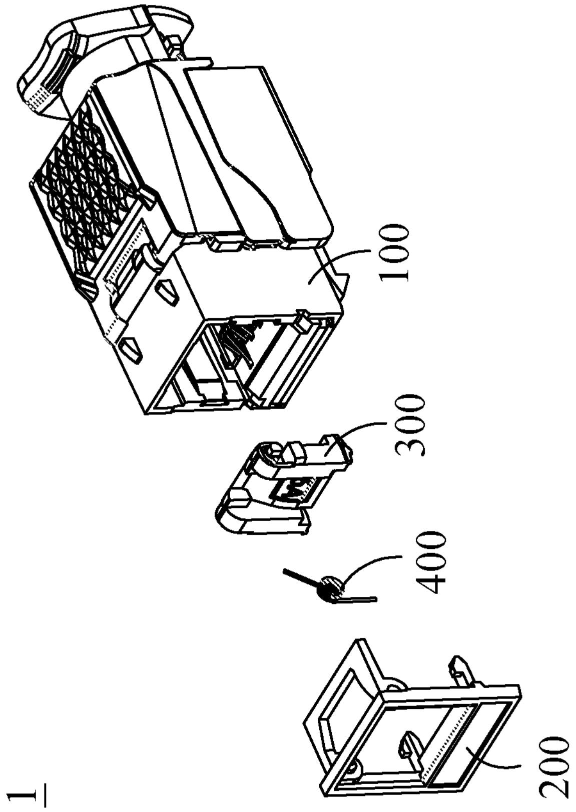
FIG. 4 is an exploded view of FIG. 3.
Figure 3:
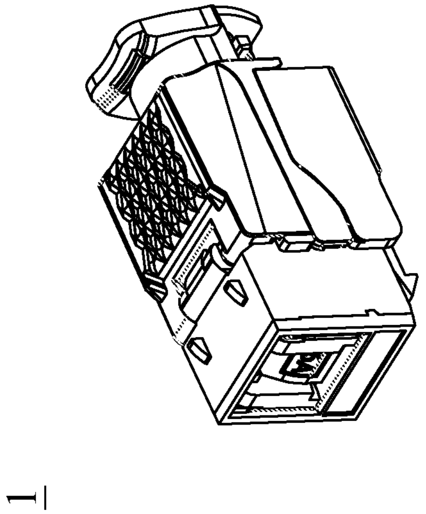
FIG. 3 is a perspective view illustrating a shuttered keystone jack assembly according to an embodiment of the disclosure.

Referring to FIG. 3 and FIG. 4, a shuttered keystone jack assembly 1 according to an embodiment of the disclosure is provided. The shutter keystone jack assembly 1 is configured to receive a plug electrically connected to a cable disposed in a panel of a terminal device such as a router or a server, and the shutter keystone jack assembly 1 includes a jack housing 100, a frame 200, a shutter 300 and an elastic member 400. The frame 200 is detachably disposed on the jack housing 100. The shutter 300 is pivotally connected to the frame 200. The elastic member 400 is disposed between the frame 200 and the shutter 300.

Figure 5:
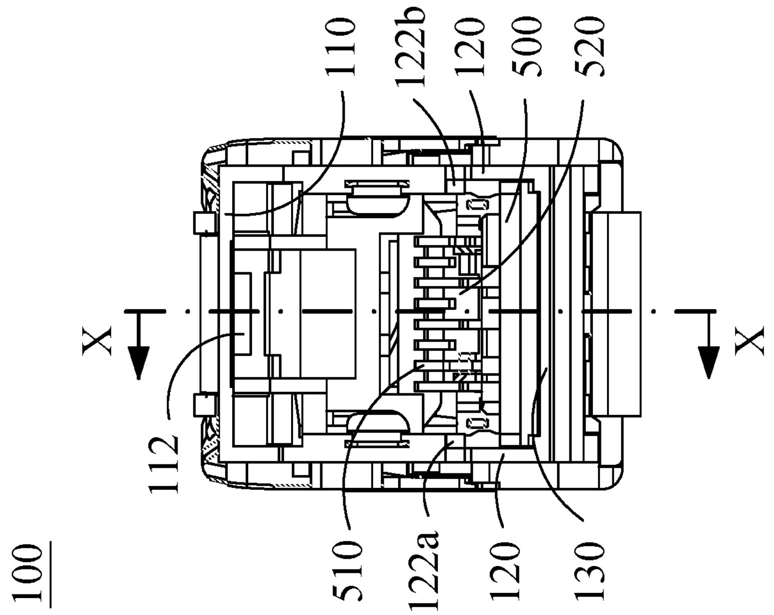
FIG. 5 is a front view of the jack housing shown in FIG. 4.
Figure 6:
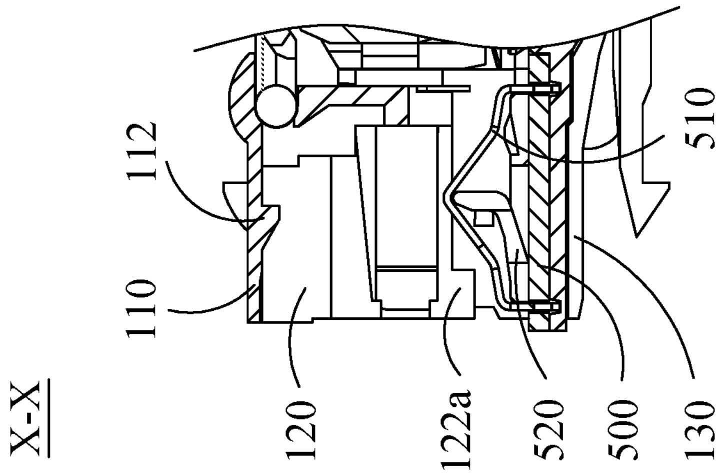
FIG. 6 is a cross-sectional diagram of the jack housing according to the cross-section X-X in FIG. 5.

Referring to FIG. 5 and FIG. 6, the jack housing 100 may be manufactured by die-casting and made of a conductive material such as magnesium-zinc alloy. The die-casting method is beneficial for rapid and mass production of metal or alloyed jack housing 100 with electromagnetic interference (EMI) immune ability. Specifically, the jack housing 100 has a first inner wall 110, two opposite second inner walls 120 substantially perpendicularly connected to the first inner wall 110, and a third inner wall connected to the second inner walls 120. The first inner wall 110, the second inner walls 120 and the third inner wall 130 cooperatively define an inner cavity configured to accommodate the plug. Preferably, the jack housing 100 further has a first engaged portion 112 disposed on the first inner wall 110. In the embodiment, the first engaged portion is a wedged structure adapted to being engaged with the frame 200, but the shape is not limited thereto. More preferably, the jack housing 100 further has two second engaged portions 122*a* and 122*b* respectively disposed on the left second inner wall 120 and the right second inner wall 120 shown in FIG. 5. The second engaged portions 122*a* and 122*b* may be ribs and are adapted to being engaged with the frame 200 from other positions relative to where the first engaged portion 112 is disposed. Besides, the shuttered keystone jack assembly 1 may further include a circuit board 500 disposed in the inner cavity to form a valid circuit with the plug. In the embodiment, the circuit board 500 is disposed on the third inner wall 130, and plural flexible spring contacts 510 are disposed on the circuit board 500. Preferably, the circuit board 500 further includes a contact holder 520 disposed beneath the spring contacts 510 for supporting the spring contacts 510 to elastically deformed due to the plug inserted into the inner cavity.

Figure 7:
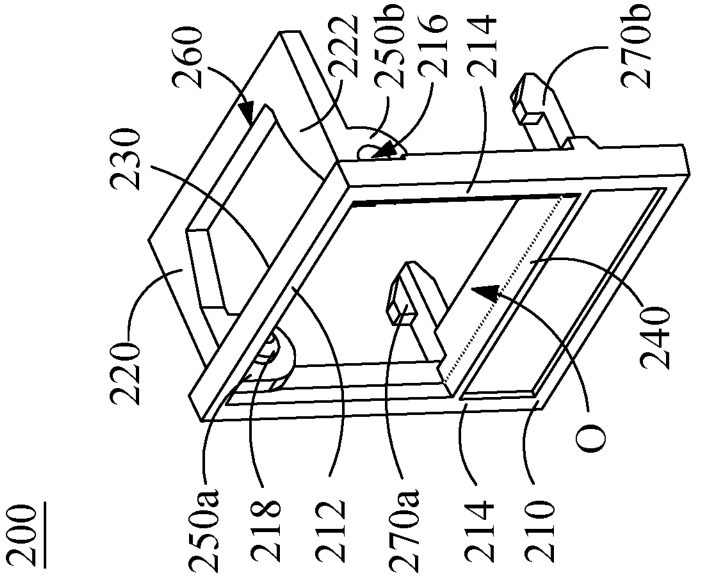
FIG. 7 is a perspective view illustrating the frame shown in FIG. 4.
Figure 8:
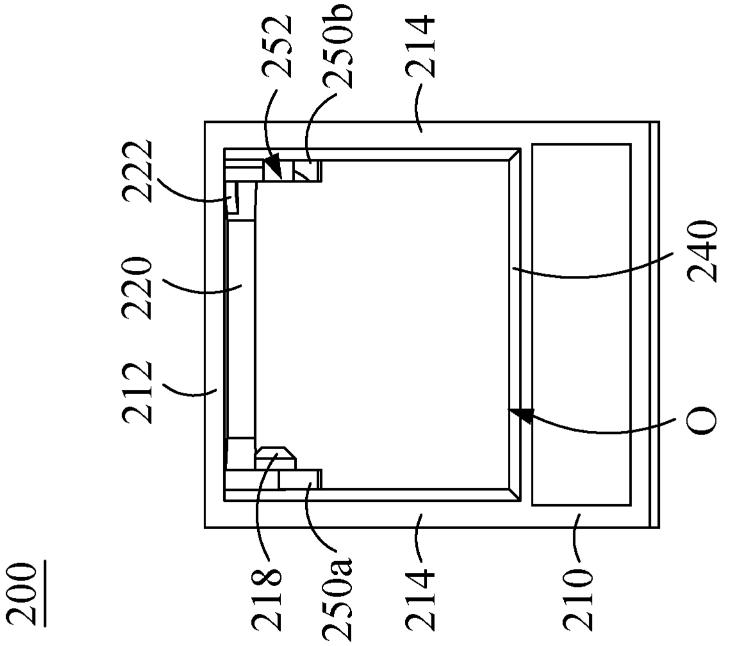
FIG. 8 is a front view of FIG. 7.
Figure 9:
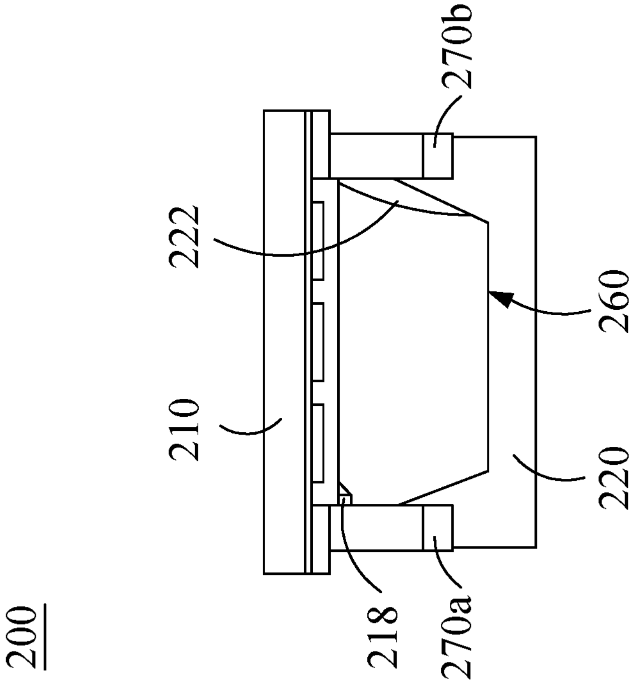
FIG. 9 is a bottom view of FIG. 7.

Referring to FIG. 7 through FIG. 9, the frame 200 is configured to support the shutter 300 and defines a receiving opening O for receiving of the plug. Specifically, the frame 200 includes an opening part 210 and a supporting part 220. The opening part 210 encloses the receiving opening O, and the supporting part 220 is substantially perpendicularly connected to a first side 212 of the opening part 210 and extends into the jack housing 100. Preferably, the frame 200 further includes a first engaging portion 260 disposed on the supporting part 220. In the embodiment, the first engaging portion 260 is a through hole and shaped to the first engaged portion 112. However, in other embodiments, the first engaged portion 112 can also be a recess, and the first engaging portion 260 can be a corresponding bump to be engaged with the recess. It is not limited by the present disclosure.

Besides, to further enhance the engagement between the jack housing 100 and the frame 200, the frame 200 further includes two second engaging portions 270*a* and 270*b* substantially perpendicularly connected to a left second side 214 and a right second side 214 of the opening part 210 in FIG. 7, respectively. The second engaging portions 270*a* and 270*b* are spaced apart from the first engaging portion 260 and extend into the jack housing 100 to be respectively engaged with the second engaged portions 122*a* and 122*b*. In the embodiment, the second engaging portions 270*a* and 270*b* are exemplary to respectively have a hook to catch the ribs of the second engaged portions 122*a* and 122*b*. However, not only the structural combination of the second engaging portions 270*a*, 270*b* and the second engaged portions 122*a* and 122*b* are not restricted to hooks and ribs, but the practical number of the second engaging portions and the second engaged portions is not necessary to be two, either. In other embodiments, the number of the second engaging portion and the second engaged portion may be respectively one, three or more as the frame 200 can be steadily mounted to the jack housing 100. Preferably, for ease of aligning the jack housing 100 and the frame 200 during mounting, the opening part 210 further includes a housing abutting portion 230 disposed on the first side 212.

On the other hand, since the shutter 300 is set to be mounted on the frame 200, the frame 200 preferably further includes a first guiding portion 250*a* and a second guiding portion 250*b* respectively connected between the left second side 214 of the opening part 210 and the supporting part 220, and between the right second side 214 of the opening part 210 and the supporting part 220. Moreover, a pivoting protrusion 218 is disposed on the first guiding portion 250*a*, and a pivoting hole 216 is formed on the second guiding portion 250*b*. Preferably, an inlet 252 is formed on a side of the second guiding portion 250*b* away from the jack housing 100 and communicated with the pivoting hole 216 for engagement with the shutter 300.

Figure 10:
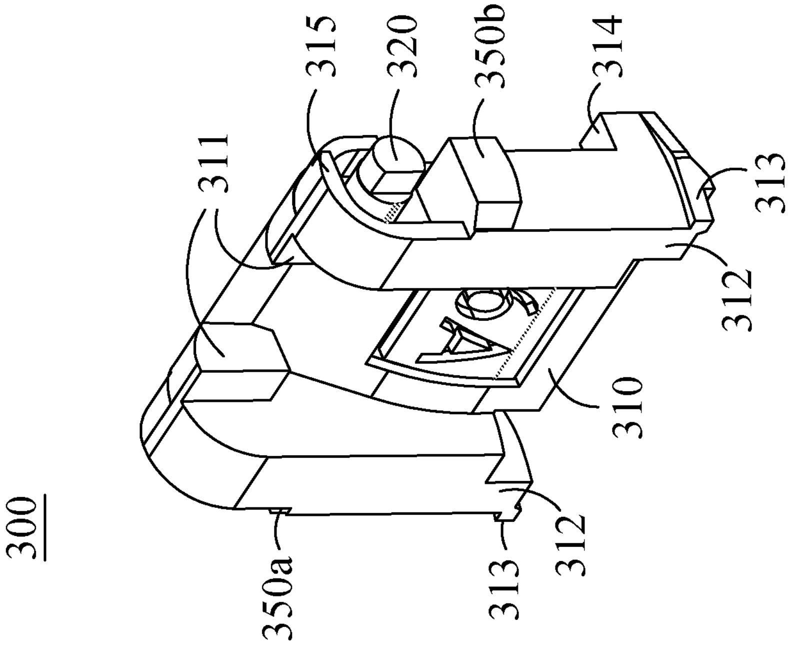
FIG. 10 is a perspective view illustrating the shutter shown in FIG. 4.
Figure 12:
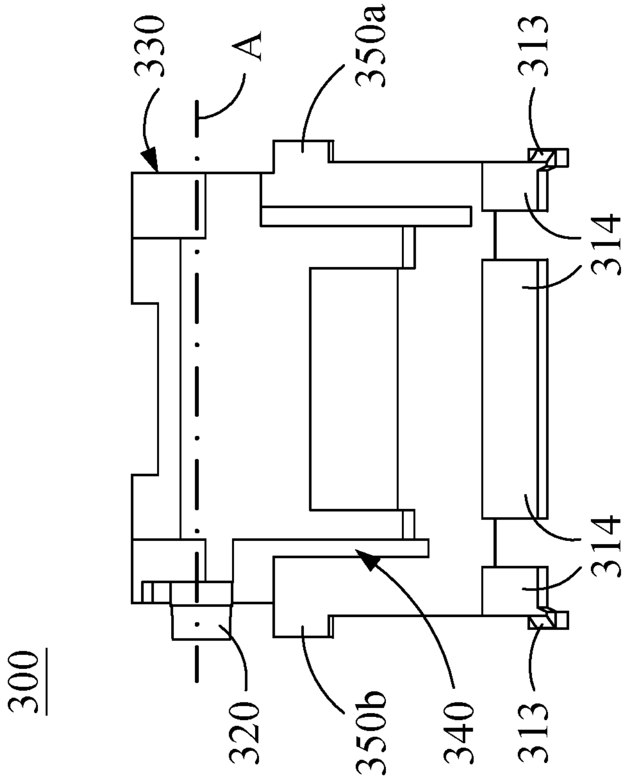
FIG. 12 is a back view of FIG. 10.
Figure 11:
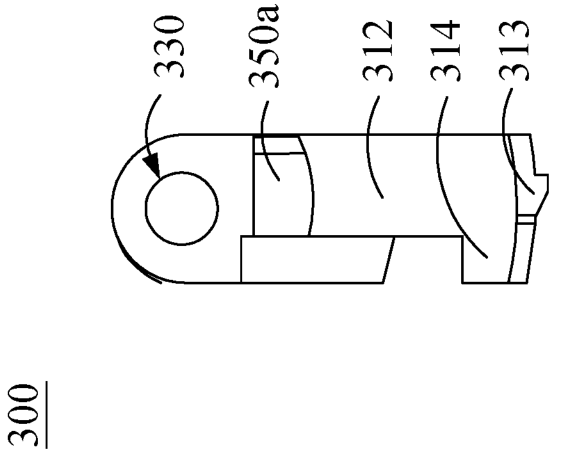
FIG. 11 is a left view of FIG. 10.
Figure 14:
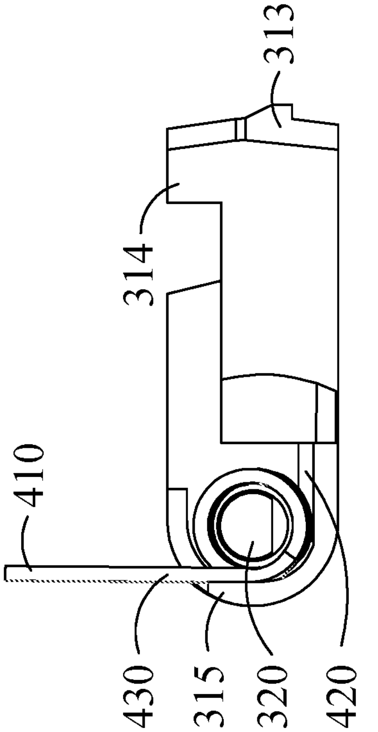
FIG. 14 is a right view illustrating the elastic member mounted on the shutter.

Referring to FIG. 10 through FIG. 12, the shutter 300 is configured to selectively cover the receiving opening O enclosed by the opening part 210 and includes a main body 310 and a pin 320 connected to the main body 310. Specifically, the main body 310 includes a front engaging portion 311, a skirt portion 312 and an elastic portion 313. The front engaging portion 311 faces opposite to the jack housing 100 after installation, and the shape of the front engaging portion 311 is corresponding to the plug for the engagement when the plug is inserted. The skirt portion 312 is disposed apart from the pin 320. For example, as shown in FIG. 10, the pin 320 is disposed on a top lateral side of the main body 310, and the skirt portion 312 is disposed on a bottom side of the main body 310. The elastic portion 313 is disposed on the skirt portion 312, preferably on the side and lower periphery of the skirt portion 313. More specifically, the frame 200 preferably further includes a threshold portion 240 disposed on the opening part 210 and outside the jack housing 100 after installation. In the embodiment, the threshold portion 240 may be a fillet structure or a tapered portion that are slightly higher than the opening part. The skirt portion 312 and the elastic portion 313 are configured to abut against the threshold portion 240 when the shutter 300 is mounted to the frame 200, and will be restricted by the threshold portion 240 after mounting.

On the other hand, the pin 320 is pivoted to the frame 200 after installation. Specifically, the shutter 300 is configured to pivot with respect to the frame 200 about a pivot axis A between a closed position in which the receiving opening O is covered by the shutter 300 and an open position in which the receiving opening O is present for receiving the plug. Besides, a recess 330 is formed on an opposite side of the main body 310 relative to the pin 320. After the shutter 300 is mounted to the frame 200, the pivoting protrusion 218 will be accommodated in the recess 330, the pin 320 will be accommodated in the pivoting hole 216, and the pivoting hole 216, the pivoting protrusion 218, the pin 320 and the recess 330 are all extending along the pivot axis A.

Preferably, the shutter 300 further includes a holding portion 314 disposed on the skirt portion 312 and a blocking portion 315 extending from the main body 310 and adjacent to the pin 320. Specifically, the holding portion 314 is disposed on a back side of the skirt portion 312 to be engaged with the supporting part 220 when the shutter 300 is pivoted to the open position. The blocking portion 315 is configured to block and restrict the elastic member 400 when the elastic member 400 is mounted to the shutter 300.

It is worth mentioning that the frame 200 and the shutter 300 can be made of chromatic plastics. Thereby, even if the jack housing 100 were made of magnesium-zinc alloy for the EMI immune ability and thus losing apparent visual variations, the frame 200 and the shutter 300 can have distinguishable colors for users or technicians to rapidly recognize each shuttered keystone jack assembly 1 and its corresponding plug.

Figure 13:
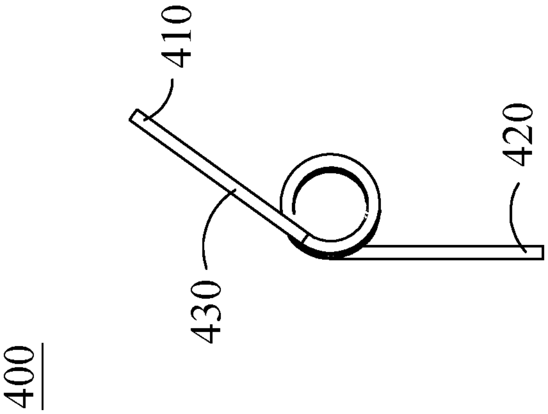
FIG. 13 is a right view illustrating the elastic member shown in FIG. 4.

Referring to FIG. 13, the elastic member 400 is exemplary to be a coil spring and includes a first end portion 410 and a second end portion 420. Specifically, the elastic member 400 is configured to be mounted to the shutter 300 and provide a resistance when the shutter 300 is pressed by the plug and pivots to the open position. To prevent relative friction and simplify the loading mode of the shutter, after installation, the first end portion 410 and the second end portion 420 respectively abut against the frame 200 and the shutter 300. Preferably, the elastic member 400 further includes a connecting portion 430 connected between the first end portion 410 and the second end portion 420.

Referring to FIG. 14 through FIG. 19, the assembling process among the frame 200, the shutter 300 and the elastic member 400 will be illustrated in detail. Firstly, the elastic member 400 will be mounted to the shutter 300. Specifically, as shown in FIG. 12, a positioning groove 340 is concaved relative to the main body 310 and adjacent to the pin 320. Therefore, the elastic member 400 can be sleeved onto the pin 320, and the second end portion 420 is disposed in the positioning groove 340. However, because of the presence of the blocking portion 315, the connecting portion 430 is blocked by the blocking portion 315 so as to pre-press the elastic member 400 from the original expanded angle (about 135 degrees) to a compressed angle (about 90 degrees), and the first end portion 410 extrudes out of the shutter 300.

Figure 15:
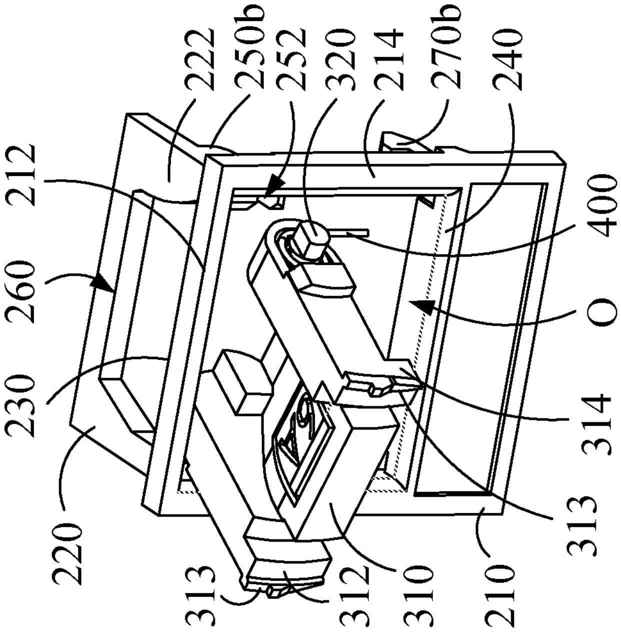
FIG. 15 is a perspective diagram illustrating the shutter with the elastic member being mounted to the frame.

Then, the user can start to mounted the shutter 300 with the elastic member 400 to the frame 200. As shown in FIG. 15, the recess 330 should be sleeved on the pivoting protrusion 218 first to earn as much as possible space for the opposite side with the pin 320 and the elastic member 400.

Figure 16:
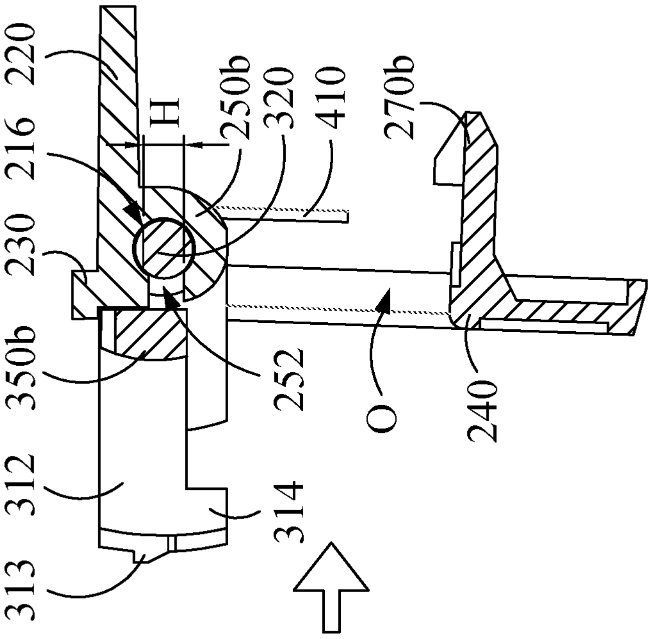
FIG. 16 is a cross-sectional diagram illustrating the shutter sliding relative to the frame.
Figure 18:
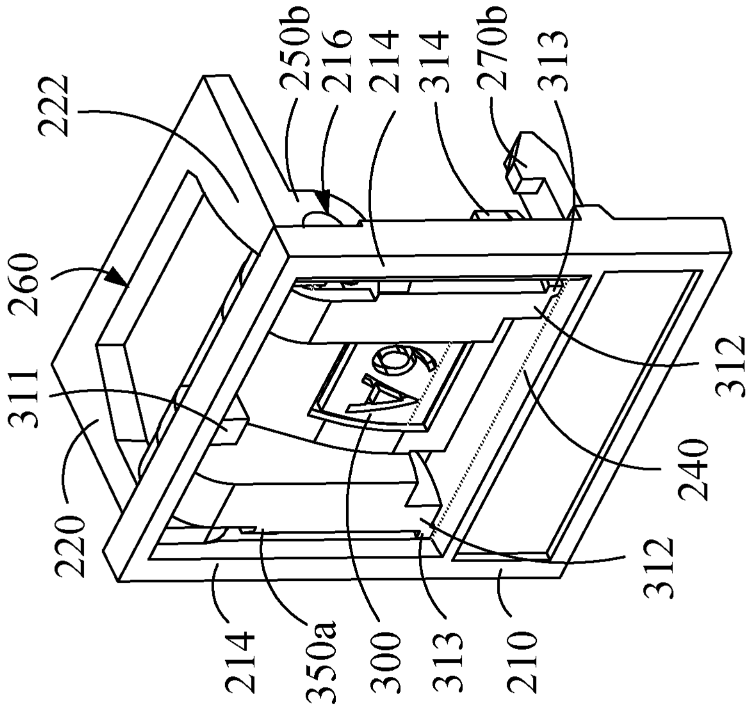
FIG. 18 is a perspective view illustrating the frame and the shutter after mounting.

As shown in FIG. 16, in the embodiment, a cross-section of the pin 320 is bounded by a superior arc and a chord terminating the superior arc, wherein the cross-section has a height H which is less than a diameter of the pin 320. It is noted that the inlet 252 is sized to the height H, so the shutter 300 can closely slide with respect to the frame 200 along the arrow direction shown in FIG. 16 until the pin 320 fully enters the pivoting hole 216. Preferably, the shutter 300 further includes two positioning portions 350*a* and 350*b* respectively disposed on the left lateral side and the right lateral side of the main body 310, and the guiding portions 250*a* and 250*b* have rounded lower peripheries. Thereby, when the positioning portions 350*a* and 350*b* is pushed to abut against the guiding portions 250*a* and 250*b*, the user can realize that not only the pivoting protrusion 218 is accommodated in the recess 330, but the entire pin 320 slides into the pivoting hole 216.

Figure 17:
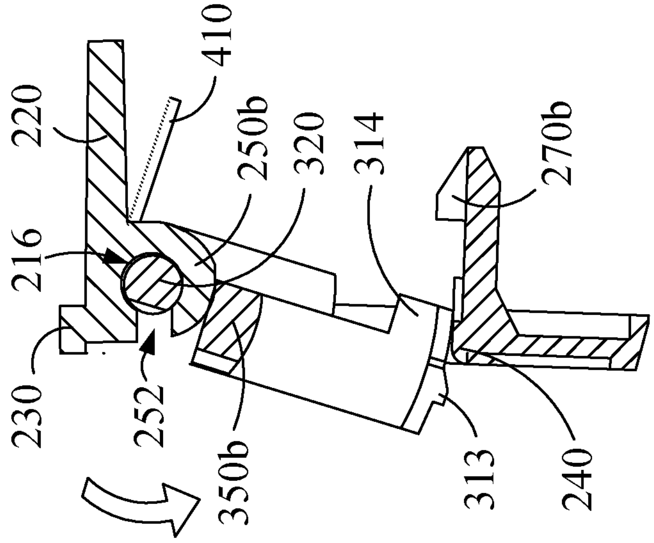
FIG. 17 is a cross-sectional diagram illustrating the shutter pivoting relative to the frame after sliding.
Figure 19:
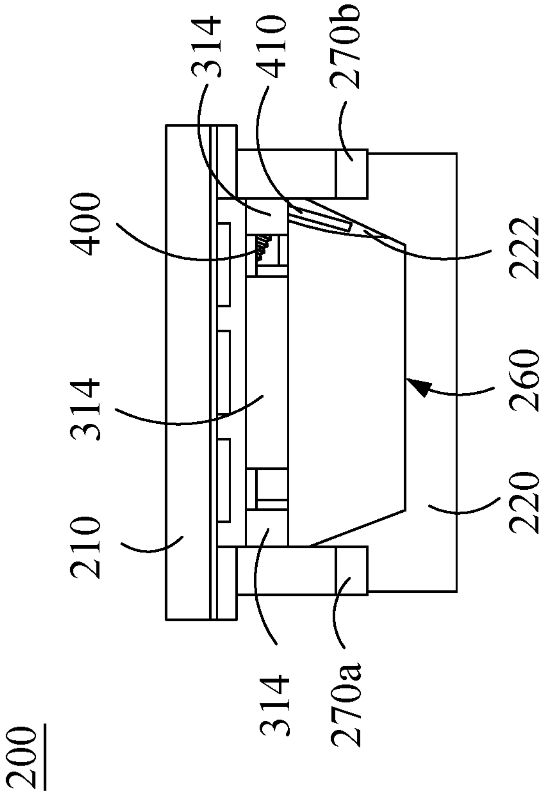
FIG. 19 is a bottom view of FIG. 18.

Then, as shown in FIG. 17, the user would start to rotate the shutter 300. Specifically, as the shutter 300 pivots with respect to the frame 200, the positioning portions 350*a* and 350*b* move along the guiding portions 250*a* and 250*b*. Since the diameter of the pin 320 is larger than the height H, the pin 320 is unable to escape from the pivoting hole 216 after pivoting. When the skirt portion 312 is near the frame 200, the elastic portion 313 would contact the threshold portion 240. Preferably, the size of the receiving opening O and the geometry of the threshold portion 240 are designed to make the elastic portion 313 slightly elastically deformed to cross over the threshold portion 240 toward the jack housing 100 along the arrow direction shown in FIG. 17 as the shutter 300 is mounted to the frame 200.

On the other hand, the frame 200 preferably further includes an abutted portion 222 disposed on the supporting part 220 and forming a step difference with the supporting part 220. After the elastic portion 313 cross over the threshold portion 240, the receiving opening O is covered by the shutter 300, and the first end portion 410 extruding out of the shutter 300 will abut against the abutted portion 222. Therefore, the first end portion 410 is restricted by the step difference between the supporting part 220 and the abutted portion 222, and the elastic member 400 is pre-pressed as the shutter 300 covers the receiving opening O. This configuration makes the skirt portion 312 always pressed against and blocked by the opening part 210, and an automatic closing mode of the shutter 300 is achieved to prevent contaminants from entering the receiving opening O.

Moreover, since the elastic member 400 is sleeved on the pin 320 that the pivot axis A passes through, and the first end portion 410 and the second end portion 420 respectively abut against the abutted portion 222 and the positioning groove 340, the motion of the shutter 300 as the plug inserts can be simplified to a pure pivoting that will reduce loadings exerted on the shutter 300. Besides, because there is not relative sliding between the jack housing 100 and the elastic member 400, the service life of the shuttered keystone jack assembly 1 can be increased, and a risk of the elastic member 400 falling inside the jack housing 100 can be eliminated.

Figure 20:
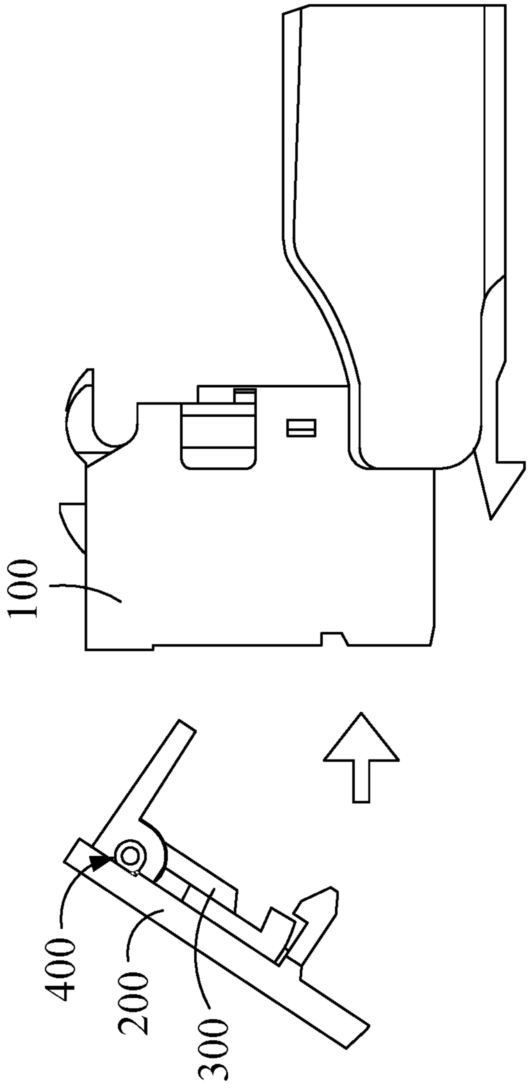
FIG. 20 is a right view illustrating the frame with the shutter being mounted to the jack housing.
Figure 21:
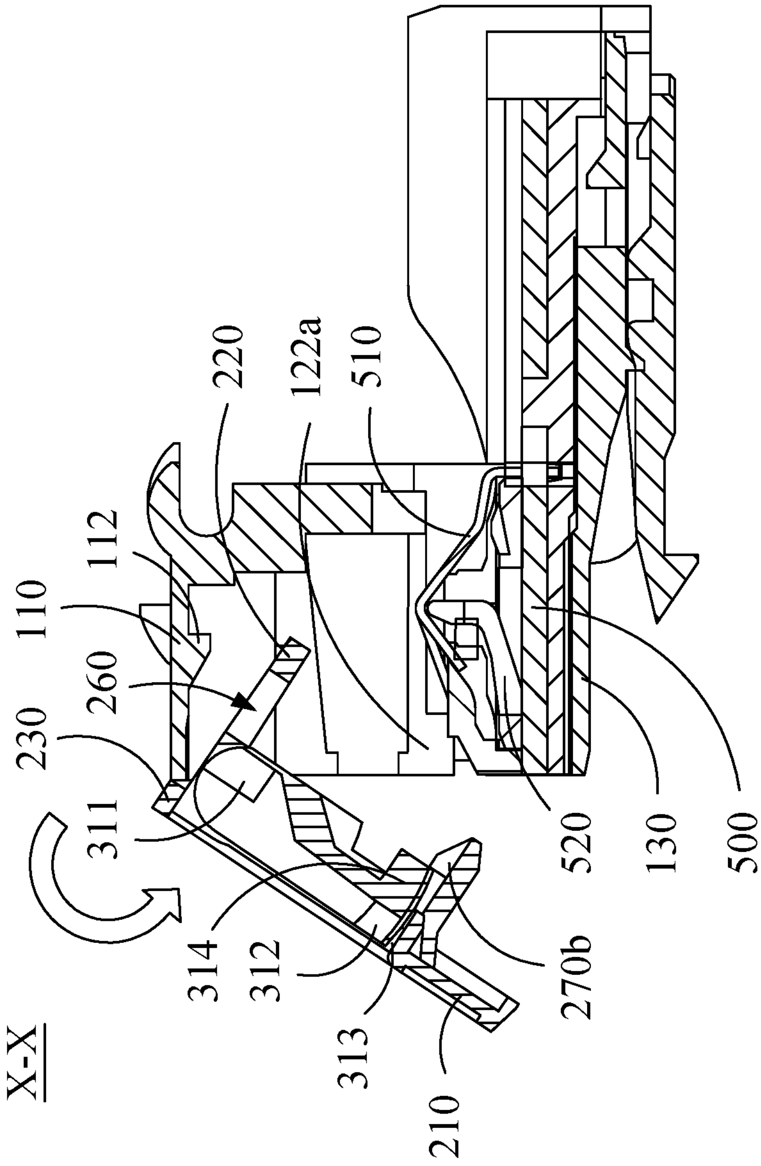
FIG. 21 is a cross-sectional diagram illustrating the frame with the shutter abutting against and pivoting relative to the jack housing according to the cross-section X-X in FIG. 5.
Figure 22:
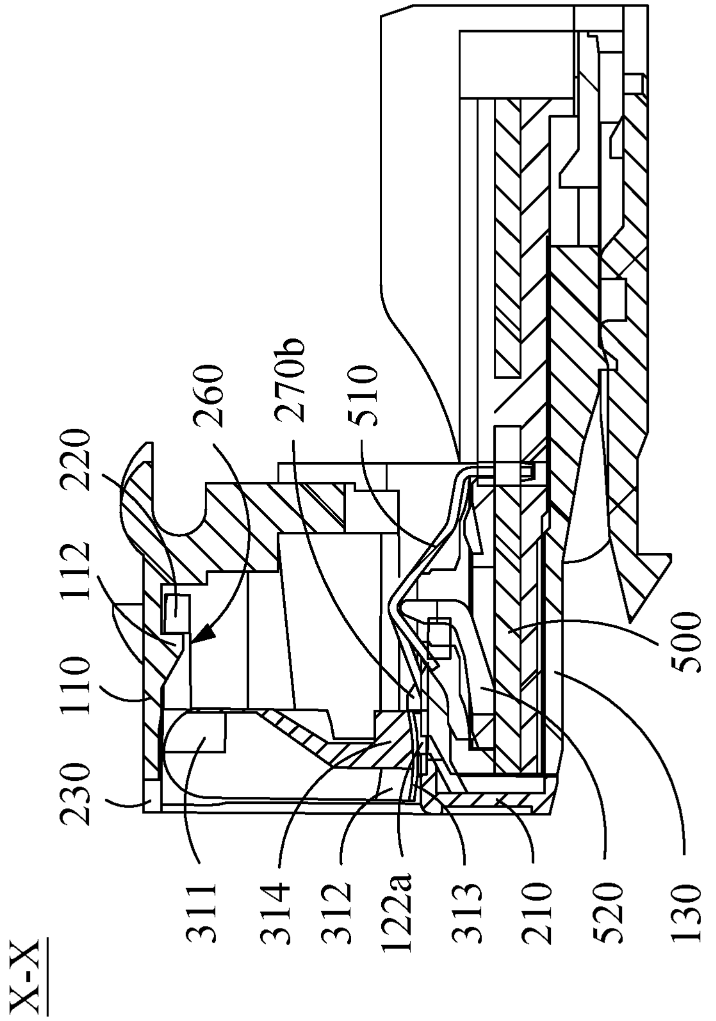
FIG. 22 is a cross-sectional diagram illustrating the jack housing, the frame and the shutter after mounting according to the cross-section X-X in FIG. 5.
Figure 23:
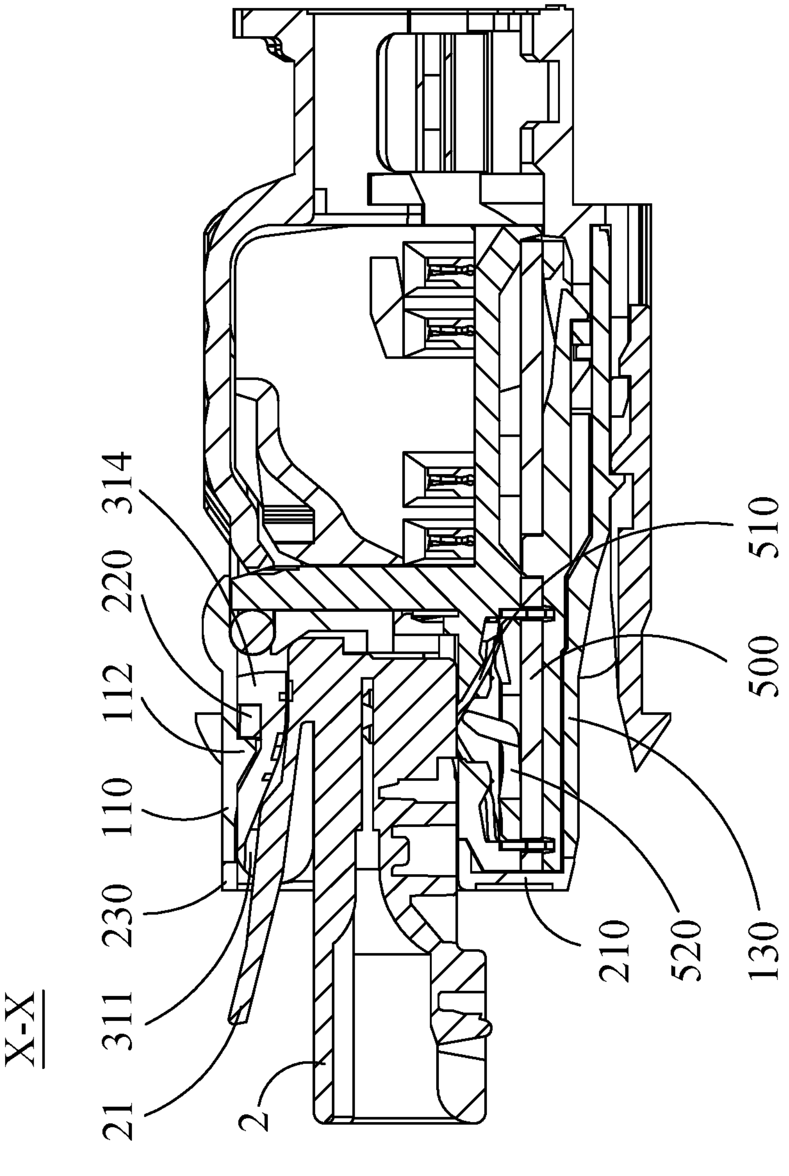
FIG. 23 is a cross-sectional diagram illustrating the shutter being in an open position according to the cross-section X-X in FIG. 5.

Referring to FIG. 20 through FIG. 23, after completing the assembling among the frame 200, the shutter 300 and the elastic member 400, the next step is to mount the frame 200 with the shutter 300 and the elastic member 400 onto the jack housing 100. As shown in FIG. 20, the user can tilt the frame 200 to make sure the supporting part 220 and the second engaging portions 270*a* and 270*b* are able to be received in the inner cavity of the jack housing 100, then move the frame 200 along the arrow direction shown in FIG. 20 until the frame 200 contact the jack housing 100. As shown in FIG. 21, as the frame 200 is mounted to the jack housing 100, the housing abutting portion 230 abuts against the jack housing 100 first, and the first engaging portion 260 and the second engaging portions 270*a*, 270*b* are pivoted about the housing abutting portion 230. The frame 200 is pivoted until the first engaging portion 260 and the second engaging portions 270*a*, 270*b* are respectively engaged with the first engaged portion 112 and the second engaged portions 122*a*, 122*b*. Thereby, the frame 200 is secured on the jack housing 100 from at least two different positions, and the mounting stability is enhanced.

It is worth mentioning that the holding portion 314 will be pivoted to engage with the supporting part 220 when the shutter 300 is rotated to the open position. Therefore, when the plug is inserted into the inner cavity, even if the user accidentally pulls the cable connected to the plug 2, since the holding portion 314 is engaged with the supporting part 220, and the supporting part 220 is engaged with the first engaged portion 112 through the first engaging portion 260, the frame 200 and the shutter 300 are steadily kept attached to the jack housing 100 and will not be pulled out. The only way to remove the plug 2 from the shutter 300 is to press a plug latch 21 disposed on the plug 2 to disable the engagement between the plug latch 21 and the front engaging portion 311. This restriction ensures the connecting robustness and prevents the shuttered keystone jack assembly 1 from being damaged.

While the present disclosure has been described by means of specific embodiments, numerous modifications and variations could be made thereto by those skilled in the art without departing from the scope and spirit of the present disclosure set forth in the claims.

What is claimed is:

1. A shuttered keystone jack assembly, comprising:
- a jack housing;
- a frame detachably disposed on the jack housing and defining a receiving opening;
- a shutter pivotally connected to the frame and selectively covering the receiving opening; and
- an elastic member comprising a first end portion and a second end portion, wherein the first end portion and the second end portion respectively abut against the frame and the shutter.

2. The shuttered keystone jack assembly according to claim 1, wherein the keystone jack assembly is adapted to receive a plug, and the shutter comprises a front engaging portion facing opposite to the jack housing and selectively engaged with the plug.

3. The shuttered keystone jack assembly according to claim 1, wherein the frame and the shutter are made of chromatic plastics.

4. The shuttered keystone jack assembly according to claim 1, wherein the jack housing is manufactured by die-casting and made of a magnesium-zinc alloy.

5. The shuttered keystone jack assembly according to claim 1, wherein the jack housing has a first inner wall and a first engaged portion disposed on the first inner wall, and the frame comprises:
- an opening part enclosing the receiving opening;
- a supporting part substantially perpendicularly connected to a first side of the opening part and extending into the jack housing; and
- a first engaging portion disposed on the supporting part and engaged with the first engaged portion.

6. The shuttered keystone jack assembly according to claim 5, wherein the frame further comprises an abutted portion disposed on the supporting part and forming a step difference with the supporting part, and the first end portion abuts against the abutted portion and is restricted by the step difference.

7. The shuttered keystone jack assembly according to claim 5, wherein the shutter comprises:

a pin pivoted to the frame;

a skirt portion disposed apart from the pin; and a holding portion disposed on the skirt portion;

wherein the shutter is pivoted between a closed position in which the receiving opening is covered by the shutter, and an open position in which the holding portion is engaged with the supporting part.

8. The shuttered keystone jack assembly according to claim 5, wherein the frame further comprises a guiding portion connected between the opening part and the supporting part, the shutter comprises a main body and a positioning portion disposed on a lateral side of the main body, and the positioning portion moves along the guiding portion as the shutter pivots with respect to the frame.

9. The shuttered keystone jack assembly according to claim 5, wherein the jack housing further has a second inner wall connected to the first inner wall and a second engaged portion disposed on the second inner wall, the frame further comprises a second engaging portion substantially perpendicularly connected to a second side of the opening part and spaced apart from the first engaging portion, and the second engaging portion extends into the jack housing and is engaged with the second engaged portion.

10. The shuttered keystone jack assembly according to claim 9, wherein the opening part further comprises a housing abutting portion disposed on the first side, as the frame is mounted to the jack housing, the housing abutting portion abuts against the jack housing, and the first engaging portion and the second engaging portion are pivoted about the housing abutting portion to respectively be engaged with the first engaged portion and the second engaged portion.

11. The shuttered keystone jack assembly according to claim 5, wherein the shutter comprises:

a pin pivoted to the frame; and a skirt portion disposed apart from the pin;

wherein when the receiving opening is covered by the shutter, the skirt portion is pressed against and blocked by the opening part.

12. The shuttered keystone jack assembly according to claim 11, wherein the frame further comprises a threshold portion disposed on the opening part and outside the jack housing, the shutter further comprises an elastic portion disposed on the skirt portion, and the elastic portion is elastically deformed to cross over the threshold portion toward the jack housing as the shutter is mounted on the frame.

13. The shuttered keystone jack assembly according to claim 1, wherein the shutter is configured to pivot with respect to the frame about a pivot axis and comprises a pin extending along the pivot axis, and the elastic member is sleeved on the pin.

14. The shuttered keystone jack assembly according to claim 13, wherein the shutter further comprises a main body connected with the pin, a positioning groove is concaved relative to the main body and adjacent to the pin, and the second end portion is disposed in the positioning groove.

15. The shuttered keystone jack assembly according to claim 14, wherein the shutter further comprises a blocking portion extending from the main body and adjacent to the pin, the elastic member further comprises a connecting portion connected between the first end portion and the second end portion, and the connecting portion is blocked by the blocking portion so as to pre-press the elastic member as the shutter covers the receiving opening.

16. The shuttered keystone jack assembly according to claim 13, wherein the frame has a pivoting hole and a pivoting protrusion extending along the pivot axis, the shutter further comprises a main body connected with the pin, a recess is formed on an opposite side of the main body relative to the pin, and the pivoting protrusion and the pin are respectively accommodated in the recess and the pivoting hole.

17. The shuttered keystone jack assembly according to claim 16, wherein the frame further comprises a guiding portion on which the pivoting hole is formed, an inlet is formed on a side of the guiding portion away from the jack housing and communicated with the pivoting hole.

18. The shuttered keystone jack assembly according to claim 17, wherein a cross-section of the pin is bounded by a superior arc and a chord terminating the superior arc, the inlet is sized to a height of the cross-section, and the height is less than a diameter of the pin.

* * * * *